United States Patent [19]

Ito et al.

[11] Patent Number: 4,614,696
[45] Date of Patent: Sep. 30, 1986

[54] NEGATIVE ELECTRODE PLATE FOR ALKALINE STORAGE CELLS OF SEALED TYPE

[75] Inventors: Tukasa Ito; Noriyuki Miyazaki, both of Sumoto, Japan

[73] Assignee: Sanyo Electric Co., Ltd, Japan

[21] Appl. No.: 680,817

[22] Filed: Dec. 12, 1984

[30] Foreign Application Priority Data

Dec. 20, 1983 [JP] Japan ................................ 58-241210
Mar. 26, 1984 [JP] Japan ................................ 59-57772
Mar. 27, 1984 [JP] Japan ................................ 59-60178
Apr. 11, 1984 [JP] Japan ................................ 59-72418

[51] Int. Cl.$^4$ ............................................. H01M 4/36
[52] U.S. Cl. ................................... 429/222; 429/216; 429/217
[58] Field of Search .................... 429/222, 216, 217

[56] References Cited

U.S. PATENT DOCUMENTS

4,316,945  2/1982  Marcham et al. ................... 429/222

FOREIGN PATENT DOCUMENTS

2741825  3/1978  Fed. Rep. of Germany ...... 429/222
54-50843  4/1979  Japan ................................... 429/222
57-96463  6/1982  Japan ................................... 429/222
58-32362  2/1983  Japan ................................... 429/222

Primary Examiner—Brian E. Hearn
Assistant Examiner—Stephen J. Kalafut
Attorney, Agent, or Firm—Darby & Darby

[57] ABSTRACT

The present invention provides a negative electrode plate for alkaline storage cells of the sealed type which comprises an active material layer formed on each of opposite surfaces of an electrically conductive carrier sheet from a paste composed chiefly of a cadmium oxide powder, and an electrically conductive layer comprising a carbon powder and formed over the surface of the active material layer, which gives e.g., greatly improved ability to absorb oxygen gas.

15 Claims, 3 Drawing Figures

NEGATIVE ELECTRODE PLATE FOR ALKALINE STORAGE CELLS OF SEALED TYPE

BACKGROUND OF THE INVENTION

1. Field of the Invention

The present invention relates to a negative electrode plate for alkaline storage cells of the sealed type which is improved in oxygen gas absorbing ability, etc., and more particularly to a negative electrode plate prepared from a cadmium paste.

2. Prior Art

Negative cadmium electrode plates of the paste type have great advantages over negative cadmium electrode plates of the sintered type in that they can be fabricated at a low cost by a simple process and provide a high energy density. However, the negative electrode plate of this type is low in electron conductivity, therefore exhibits poor ability to absorb the oxygen gas evolved from the positive electrode owing to excessive charging and has the drawback that the internal gas pressure is liable to build up when it is used in sealed cells. The oxygen gas absorbing reaction at the negative cadmium electrode plate is represented by the following equation.

$$Cd + \tfrac{1}{2}O_2 + H_2O \rightarrow Cd(OH)_2 \tag{1}$$

Thus, the reaction takes place at the interfaces between the three phases of gas, liquid and solid. The more metallic cadmium contacts oxygen gas, the more is the reaction accelerated. With the sintered electrode plate wherein a sintered base of nickel serves as an electrically conductive matrix, the charging reaction proceeds uniformly over the entire electrode plate through the matrix, readily permitting formation of metallic cadmium also in the vicinity of the plate surface. With the negative cadmium electrode plate of the paste type, however, the active material layer is low in electrical conductivity, so that the charging reaction slowly proceeds from the neighborhood of the carrier sheet toward the plate surface, consequently involving difficulty in forming metallic cadmium in the vicinity of the plate surface away from the conductive carrier sheet. Accordingly oxygen gas is not absorbed before passing through the plate surface layer which is low in gas permeability, hence poor ability to absorb oxygen gas.

With attention directed to the above drawback, several proposals have been made.

Proposal (1): Method of causing oxygen gas to easily penetrate into the electrode plate by giving ennanced hydrophobic tendency to the neighborhood of the plate surface. This method reduces the amount of electrolyte retained in the neighborhood of the plate surface, rendering the active material less utility and increasing the internal resistance of the cell to impair the cell characteristics.

Proposal (2): Method of facilitating presence of metallic cadmium on the plate surface by forming projections on the electrically conductive carrier sheet and thereby locally decreasing the distance between the carrier sheet and the plate surface. This method permits metallic cadmium to appear on the plate surface relatively rapidly, but it is difficult for the metallic cadmium to spread over the plate surface and to come into contact with oxygen gas over an increased area. The ability to absorb oxygen gas is therefore almost as low as that of conventional electrode plates. With cells of the sealed type, moreover, the electrode plate and separator are usually subjected to a considerable structural pressure, so that some projections on the carrier sheet are likely to become exposed at the surface of the active material layer of the soft paste-type electrode plate and to reach the positive electrode through the separator to cause shortcircuiting within the cell.

Proposal (3): Method of facilitating presence of metallic cadmium on the plate surface by forming indentations in the plate surface and locally decreasing the distance between the conductive carrier sheet and the plate surface as in the case of Proposal (2). The electrode plate thus formed is not greatly different from conventional ones in oxygen gas absorbing ability. When the plate is assembled into a cell, the resulting structural pressure is likely to collapse some indentation-defining projections on the plate surface. The indentations formed in the plate surface result in a reduction in the plate capacity, hence disadvantageous (see Published Examined Japanese Patent Application No. SHO 47-45460).

Proposal (4): Method of preforming a metal cadmium layer on the plate surface. With this method, the metallic cadmium participates directly in the charge-discharge reaction, with the result that charging and discharging, when repeated, converts the metallic cadmium in the vicinity of the plate surface to cadmium hydroxide, entailing impaired ability to absorb oxygen gas (see Published Unexamined Japanese Patent Application No. SHO 54-109143).

As already stated, therefore, the conventional negative cadmium electrode plates of the paste type for sealed alkaline cells still remain to be improved in oxygen gas absorbing ability.

SUMMARY OF THE INVENTION

The present invention provides a negative electrode plate for alkaline storage cells of the sealed type which comprises an active material layer formed on each of opposite surfaces of an electrically conductive carrier sheet from a paste composed chiefly of a cadmium oxide powder, and an electrically conductive layer comprising a carbon powder and formed over the surface of the active material layer.

Preferably the active material layer of the present invention has incorporated therein an electrically conductive matrix which comprises carbon fibers only, or carbon fibers and other synthetic fibers. Further preferably the active material for forming the active material layer comprises a cadmium oxide powder and a small amount of metallic cadmium powder admixed therewith. Alternatively, when metallic cadmium is not added, it is desirable to subject the negative plate to a chemical formation process to cause the active material layer to incorporate metallic cadmium formed therein.

The present invention also provides a transfer method of forming the electrically conductive layer of the negative electrode plate.

DESCRIPTION OF THE PREFERRED EMBODIMENTS

Figure 1:
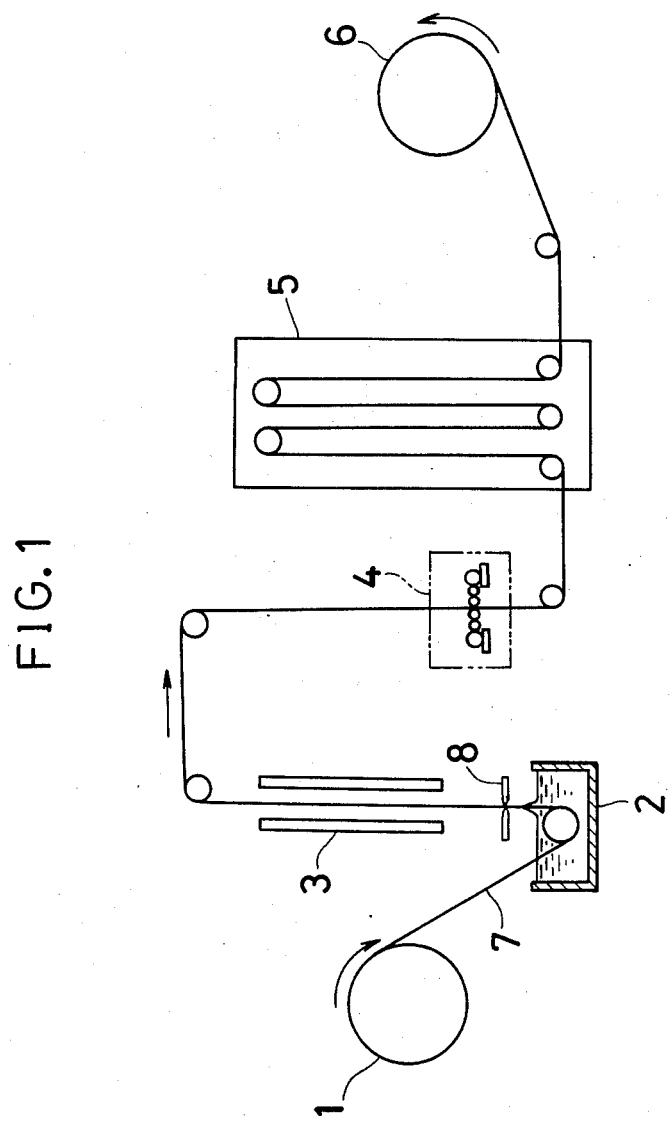
FIG. 1 is a diagram illustrating an apparatus for preparing negative cadmium electrode plates of the paste type.

The negative electrode plate of the present invention is used for alkaline storage cells of the sealed type having a common construction which comprises, for example, a negative electrode plate, a positive nickel electrode plate, a separator interposed between the two plates, a casing, a sealed cover, an insulating gasket and an alkaline electrolytic solution. However, the present electrode plate is not limited to use in such cells.

The electrically conductive carrier sheet to be used for the negative electrode plate of the invention means one useful for sealed alkaline storage cells, such as a punched metal plate (made of nickel-plated iron and having a thickness of 0.06 to 0.08 mm) and nickel-plated iron netting.

The active material, a component of the present negative electrode plate, usually comprises a cadmium oxide powder (e.g. 0.6 to 1.5 microns in mean particle size) only, or the combination of such a powder and a metallic cadmium power (0.5 to 2.0 microns in mean particle size). The cadmium oxide powder and the metallic cadmium powder are used in a ratio by weight of 8:2 to 9.5:0.5, preferably 9:1.

The cadmium powder and the metallic cadmium powder are used usually in the form of a paste for forming an active material layer over each surface of the conductive carrier sheet. Other useful materials for forming the paste are water serving as a medium, binders such as hydroxypropylcellulose, methylcellulose, polyvinyl alcohol, carboxymethylcellulose, and mixtures thereof, and reinforcing materials such as polyethyelene fibers, carbon fibers and mixture thereof.

The amount of the binder, which is not limited particularly, is for example 0.5 to 1.5 parts by weight per 100 parts by weight of the active material.

The reinforcing material is used, for example, in an amount of 0.3 to 1.0 part by weight, per 100 parts by weight of the active material. Examples of fibers useful as reinforcing materials are short fibers about 1 mm in length and 2 denier in diameter. Carbon fibers may be carbonaceous fibers or graphite fibers.

We have unexpectedly found that carbon fibers, when used, form an electrically conductive matrix within the active material layer, giving increased conductivity to the interior of the electrode plate and inhibiting the interior of the electrode from locally reaching a hydrogen producing potential early, hence desirable. Preferably 0.5 to 5 parts by weight of carbon fibers are used per 100 parts by weight of the active material.

The active material layer can be formed on each surface of the conductive carrier sheet by applying the active material-containing paste to the surface in a usual manner and drying the coating. The combined thickness of the carrier sheet and opposite active material layers is generally about 0.5 to about 0.7 mm.

When the metallic cadmium powder is not incorporated into the active material layer, it is desirable to form the active material layer first and to subject the coated carrier sheet to a chemical conversion treatment in an alkaline electrolytic solution with passage of current before or after an electrically conductive layer is formed. We have found that this treatment, which is intended to form metalic cadmium, achieves a greater effect when conducted after the conductive layer has been formed. This appears attributable to the following reason. The passage of current through the conductive layer charges the interior of the plate progressively from the portion in contact with the conductive layer, so that metallic cadmium is formed from cadmium oxide in the electrode surface layer in addition to the surface of the electrode plate. When a sealed nickel-cadmium cell incorporating the plate is excessively charged to result in evolution of oxygen gas from the positive electrode, the oxygen gas is absorbed by the metallic cadmium which is present on the plate surface and easily contacts the oxgen gas. This effectively inhibits the rise of internal gas pressure of the cell.

The chemical conversion treatment is conducted by charging the negative electrode plate to not more than 60%, preferably to 30–40%, of its electrical capacity, or charging the plate to the full capacity and thereafter discharging the plate to such a level that the amount of precharge thereon will be not more than 60%, preferably 30 to 40%, of its capacity.

An electrically conductive layer comprising a carbon powder is further formed over the surface of the active material layer of the present electrode plate. The carbon powder to be used for this layer is preferably as fine as 0.1 to 0.5 microns in particle size. Preferably the conductive layer is 2 to 20 microns in thickness. The carbon powder is used in the form of a slurry or paste for forming the conductive layer. Useful media are water and organic solvents which are used for coating compositions. Useful binders may be water-soluble or oleophilic, such as those exemplified for forming the active material layer. Watersoluble binders are preferable, among which polyvinyl alcohol, sodium polyacrylate, sodium alginate, polyethylene oxide or the like is more preferable. Polyvinyl alcohol or like water-soluble binder, when brought into contact with the alkaline electrolytic solution, forms a gel layer, which serves to prevent release or removal of the active material.

The binder is used generally in an amount of 50 to 200 parts by weight per 100 parts by weight of the carbon powder. In some cases, the binder may be used in 10 times to the amount by weight of the carbon powder.

The conductive layer of the present invention, which is thin as mentioned above, can be formed with a uniform thickness from an aqueous slurry of carbon powder by a transfer method wherein transfer rollers are used. This method assures quantity production within a short period of time. The transfer method will be described later in detail with reference to an example.

Before forming the conductive layer, the active material layer need not always be completely dried but can be in a semi-dry state. A conductive layer of higher toughness will be formed when the active material layer is semi-dry.

The advangates of the present invention will be described next.

One of the features of the present invention is that an electrically conductive layer of carbon powder is formed over the surface of an active material layer. The conductive layer can be formed inexpensively by a simple method and gives greatly improved ability to absorb oxygen gas, which will be described below. With the conventional negative cadmium electrode plate, cadmium hydroxide in a discharged state changes, mainly at the conductive carrier sheet to metallic cadmium in a charged state, and metallic cadmium layer is progressively formed on the negative electrode surface in a pattern similar to the shape of the conductive carrier sheet. Further in the case of the conventional pasted negative cadmium electrode plate, it is not infrequently likely that even when the charged portion almost reaches the plate surface, a small uncharged portion will form a thin layer on the surface. Consequently a relatively small amount of metal cadmium comes into contact with the oxygen gas evolved from the positive electrode. This leads to a low ability to absorb the oxygen gas.

With the pasted cadmium electrode plate of the present invention, when the metallic cadmium formed chiefly at the conductive carrier sheet during chargning reaches the electronconductive carbon powder layer at the electrode surface, cadmium hydroxide in the vicinity of the negative electrode surface changes to metallic cadmium, and this change takes place progressively from the portion where the metal cadmium has reached along the carbon powder layer. Consequently metallic cadmium is formed preferentially over the entire electrode surface and in the vicinity thereof while allowing cadmium hydroxide in an uncharged state to remain in the interior of the active material layer, especially in the apertured portions of the carrier sheet which are formed to assure improved adhesion of the pasty active material to the carrier sheet. From this it can be understood that the electrode plate of the present invention facilitates contact between metallic cadmium and oxygen gas and has outstanding ability to absorb oxygen gas.

It is thought that the oxygen gas absorbing reaction at the negative electrode involves the following electrochemical gas absorbing reaction in addition to the chemical gas absorbing reaction of Equation (1).

$$\tfrac{1}{2}O_2 + H_2O + 2e \rightarrow 2OH^- \quad (2)$$

This reaction takes place also at the interfaces between three phases, i.e. gas phase ($O_2$), liquid phase ($H_2O$) and solid phase (e). Whereas the solid phase in Equation (1) is metallic cadmium, it is electron, namely the conductive layer, in Equation (2). With the conventional pasted negative electrode plate, metallic cadmium serves as a conductive substance. Metallic cadmium has difficulty in forming on the negative electrode surface even during charging and therefore in forming a conductive layer on the electrode surface. According to the present invention, however, the conductive layer of carbon powder provides the entire electrode surface. When metallic cadmium is formed progressively at the conductive carrier sheet and reaches the conductive surface layer, the metallic cadmium, which is conductive, electrically connects the carrier sheet to the conductive layer, with the result that the oxygen gas absorbing reaction of Equation (2) takes place at any portion of the conductive layer, hence advantageous. Although to what extent this contributes to the oxygen gas absorbing reaction within the cell still remains to be clarified, the above feature apparently contributes to the absorption of oxygen gas substantially, in view of the fact that the cells incorporating the present electrode plate are comparable in internal pressure to those including sintered negative electrode of cadmium.

Further according to a preferred embodiment of the present invention, the active material layer has an electrically conductive matrix of carbon fibers formed in its interior. The matrix gives increased conductivity to the interior of the electrode plate and inhibits the interior from locally reaching a hydrogen producing potential early to effectively reduce the amount of hydrogen gas to be evolved.

When metals are used in place of the conductive fibers incorporated in the active material layer or the conductive carbon powder contained in the surface layer on the active material layer, the following problems are encountered, but the present invention are free of such problems.

(1) When metal fibers are used for forming a matrix within the active material layer, it is difficult to uniformly disperse the metal fibers in the paste to be formed by kneading.

(2) Metallic cadmium, if used, participates directly in the charge-discharge reaction to form cadmium hydroxide of low conductivity, so that the metal fails to retain its effect.

(3) Aluminum, zinc, tin, lead, copper or the like, if used, dissolves out into the alkaline electrolytic solution and therefore becomes ineffective. The charge-discharge reaction causes zinc to form acicular crystals on the negative electrode surface, entailing short-circuiting in the interior of the cell to shorten the cell life. Lead impairs the electrode capacity, while copper promotes self-discharge of the cells through the reaction of $Cu^{2+} + e \leftrightarrow Cu^{3+}$.

(4) When iron, nickel, cobalt, platinum or the like is used, a low hydrogen overvoltage will result, giving rise to marked evolution of hydrogen gas during excessive charging and breaking down the compacted interior system of the cell.

(5) Silver, gold and other metals which occur in small amounts are much more expensive than carbon powder and are difficult to use.

(6) Other metals analogous to nonmetallic elements and substances termed conductive metallic oxides are low in conductivity and are not very effective, or are expensive. Thus they are not useful.

In contrast, carbon has the features of (1) being stable in alkaline electrolytic solutions, (2) not participating in the charge-discharge reaction and producing no influence on the cell characteristics, (3) not causing marked evolution of hydrogen gas due to a decrease in hydrogen overvoltage, and (4) being inexpensive. Accordingly carbon is more advantageous to use than metals.

EXAMPLE 1

(a) To the mixture of 90 parts by weight of cadmium oxide powder (0.7 micron in mean particle size) and 10 parts by weight of metallic cadmium powder (1.0 micron in mean particle size) were added 3 parts by weight of polyethylene fibers (0.7 mm in length and 10 microns in diameter), 0.5 part by weight of methylcellulose and 15 parts by weight of water. The mixture was then kneaded into a paste, which was applied to each surface of a punched metal sheet serving as a conductive carrier sheet, by the same method as used in Example 6 to be given later for forming paste layers. The paste coating was then dried.

(b) The conductive carrier sheet thus formed with an active material layer was dipped in a suspension comprising 5 parts by weight of acetylene black, 7 parts by weight of polyvinyl alcohol (degree of polymerization: 2,000) and 100 parts by weight of water, followed by drying. The acetylene black layer was about 10 to about 20 microns in thickness. The plate obtained was cut to obtain negative cadmium plates, 33 mm in length and 200 mm in width.

(c) The negative electrode plates, sintered positive nickel electrode plates (33 mm in width, 160 mm in length and 0.7 mm in thickness) prepared by a known method and separators of nylon nonwoven fabric were assembled into a nickel-cadmium cell of the sealed type, 1.2 AH in nominal capacity, with addition of potassium hydroxide electrolytic solution having a specific gravity of 1.26.

EXAMPLE 2

A nickel-cadmium cell of the sealed type was fabricated in the same manner as in Example 1 with the exception of using 1.5 parts by weight of polyethylene fibers and 1.0 part by weight of graphite carbon fibers (7 to 8 microns in diameter and 1.5 mm in length) in place of 3 parts by weight of polyethylene fibers used in Example 1, step (a).

COMPARATIVE EXAMPLE 1

A nickel-cadmium cell of the sealed type was fabricated using the conductive carrier sheet coated with the active material in Example 1, step (a) without forming the acetylene black layer of Example 1, step (b).

The cells obtained in Examples 1, 2 and Comparative Example 1 were overcharged with 3 hour rate current (400 mA) at 0° C. for 18 hours. The cells were checked for internal gas pressure at the end of charging, then discharged through resistance corresponding to 1.0 C. and thereafter checked for internal gas pressure. Table 1 shows the results. Each value listed is the average for five cell samples. The internal gas pressure at the end of overcharge is due to the oxygen gas and hydrogen gas evolved within the cell, while the remaining internal gas pressure is due to hydrogen gas only because the oxygen gas is consumed within the cell during discharge.

TABLE 1

| Cell | Internal gas pressure (kg/cm$^2$) | |
|---|---|---|
| | After overcharge | After discharge |
| Example 1 | 6.5 | 3.5 |
| Example 2 | 4.1 | 0.2 |
| Comp. Ex. 1 | 28.0 | 12.0 |

Table 1 reveals that the cells of the present invention are much lower in the internal gas pressure after overcharge, as well as after discharge, than the one comprising conventional pasted negative cadmium electrode plates.

The cells of Examples 1 and 2 were also checked for internal gas pressure after charging with 3 hour rate current at 0° C. and 5 hours and further discharging the charged cells through resistance. Table 2 shows the results.

TABLE 2

| Cell | Internal gas pressure (kg/cm$^2$) | |
|---|---|---|
| | After overcharge | After discharge |
| Example 1 | 1.3 | 0 |
| Example 2 | 1.5 | 0 |

The cells of the invention exhibit internal gas pressure of 0 kg/cm$^2$ on discharge, with no evolution of hydrogen gas, while oxygen gas produces only a slight increase in the internal gas pressure. The results of Tables 1 and 2 indicate that the evolution of hydrogen gas is caused by extreme overcharge.

EXAMPLE 3

A cell was fabricated in the same manner as in Example 1 except that carboxymethylcellulose was used in place of polyvinyl alcohol used in Example 1, step (b).

EXAMPLE 4

A cell was fabricated in the same manner as in Example 1 except that methylcellulose was used in place of polyvinyl alcohol used in Example 1, step (b).

EXAMPLE 5

A cell was fabricated in the same manner as in Example 1 except that hydroxypropylcellulose was used in place of polyvinyl alcohol used in Example 1, step (b).

The cells obtained in Examples 3 to 5 were checked for internal gas pressure after charging them with a current of 360 mA at 0° C. for 18 hours, with the results given in Table 3.

TABLE 3

| Cell | Internal gas pressure (kg/cm$^2$) |
|---|---|
| Example 3 | 8.2 |
| Example 4 | 10.0 |
| Example 5 | 7.2 |

EXAMPLE 6

The method of the present invention for continuously preparing negative electrode plates will be described below.

FIG. 1 shows an apparatus for preparing negative cadmium electrode plates of the paste type. With this apparatus, a conductive carrier sheet 7 in the form of a strip of punched metal is paid off from a pay-off roller 1 and wound around a take-up roller 6. During this travel, the carrier sheet 7 passes through a container 2 containing a paste of active material composed chiefly of a cadmium compound and is thereby coated with the paste on each of its opposite surfaces. The thickness of the coating is adjusted by a slit 8 provided above the paste container 2. The coating is then dried by an intermediate dryer 3, whereby an active material layer is formed first on each surface of the conductive carrier sheet. While the carrier sheet subsequently passes through a transfer roller unit 4, a carbon slurry prepared by uniformly dispersing a carbon powder in an aqueous solution of biner is applied only to the surface of each active material layer to a predetermined thickness and is then dried by a main dryer 5, giving a a completed electrode plate having a thin carbon layer on the surface of the active material layer.

According to the method described, the coated carrier sheet is dried dividedly twice by the intermediate dryer 3 and the main dryer 5, so that the intermediate dryer 3 need not completely dry the coated carrier sheet, which can be thoroughly dried by the subsequent main dryer 5. Accordingly the coated carrier sheet needs only to be dried by the intermediate dryer 3 to such an extent that the active material will not adhere to the transfer roller of the transfer roller unit 4 without collapsing of the active material layer while the carrier sheet passes through the unit. The active material layer thus dried is slightly wet in its interior and is externally dried to some extent, and therefore enables the superposed thin carbon layer to adhere thereto more effectively than when the active substance layer is completely dried. Thus, the carbon layer is unlikely to separate from the completed electrode plate.

Figure 2:
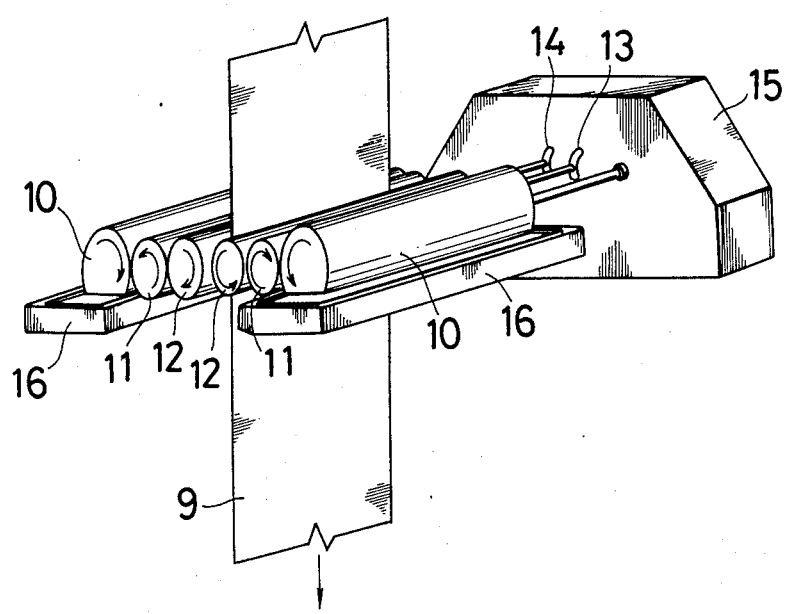
FIG. 2 is a perspective view showing a transfer roller unit.
Figure 3:
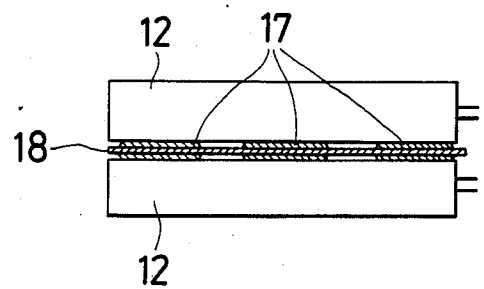
FIG. 3 is a view partly in section showing transfer rollers and an electrode plate in contact therewith.

FIG. 2 is a perspective view showing the transfer roller unit 4, while FIG. 3 is a view partly in section and showing transfer rollers in contact with the carrier sheet formed with the active material layer. As shown in FIG. 2, the transfer roller unit 4 comprises a group of transfer rollers provided for each surface of the coated carrier sheet 9 and including a first transfer roller 10, a second transfer roller 11 and a third transfer roller 12, a drive assembly 15 adapted to rotate these transfer rollers 10 to 12 and having slits 13, 14 for translating the second and third transfer rollers 11, 12 relative to the first transfer roller 10 to adjust the clearances between the rollers, and a container 16 containing the above-mentioned carbon slurry. The first transfer roller 10 is partially immersed in the slurry. When the rollers 10 to 12 of the transfer unit are rotated, the carbon slurry is applied to the surface of the first roller 10. The carbon slurry thus applied is adjusted to the desired thickness by the clearance between the first and second transfer rollers 10 and 11 and transferred to the surface of the second roller 11. Similarly the transferred slurry is eventually adjusted to the proper thickness by the clearance between the second and third transfer rollers 11 and 12 and further transferred to the surface of the third roller 12. The slurry is applied to the surface of the active material layer on the carrier sheet 9 by the third roller 12. Since the third roller 12 is in contact only with the surface of the active material layer 17 as seen in FIG. 3, no carbon layer will be formed on the exposed portions of the conductive carrier sheet 18.

Accordingly the carbon slurry can be applied by the transfer roller unit to the surface of the active material layer uniformly in a constant amount free of irregularities. This eliminates the likelihood of the electrode surface to exhibit reduced electron conductivity locally. Furthermore no carbon layer is formed on the exposed carrier sheet portions which are not amenable to deposition of the carbon slurry. If the carbon slurry is applied to the coated core by spraying, or when the coated carrier sheet is passed through the slurry for coating by dipping, the carbon layer will be formed also on the exposed core portions, which will then permit removal or separation of the carbon layer therefrom to impair the cell performance. The present apparatus eliminates this drawback.

With use of the above apparatus and method, an active material layer forming paste (having the same composition as the one used in Example 1, step (a)) was applied to each surface of a punched metal plate serving as a conductive carrier sheet and dried. Subsequently a thin carbon layer, about 5 microns in thickness, was formed on the surface of the resulting active material layer from a slurry composed of pure water, hydroxypropylcellulose and graphite in the ratio of 100:20:2 by weight and having a viscosity of 2000 cps (at 25° C.) to obtain a negative electrode strip, which was cut in specified dimensions to obtain pasted negative cadmium electrode plates. These plates and positive nickel electrode plates prepared by a known method were assembled into a nickel-cadmium cell having a nominal capacity of 1200 mAH.

EXAMPLE 7

(a) A cadmium oxide powder (65 parts by weight), 0.5 part by weight of polyethylene fibers, 0.5 part by weight of methylcellulose and 20 parts by weight of water were kneaded into a paste, which was then applied to each surface of a punched metal plate (3.4×20 cm) and dried.

(b) The plate thus formed with an active material layer was charged and discharged for chemical conversion treatment in 25% aqueous solution of potassium hydroxide, using a nickel plate as the counter electrode. The treated plate was then rinsed with water and dried.

(c) The plate was dipped in a slurry comprising 3 parts by weight of carbon black, 3 parts by weight of hydroxypropylcellulose and 100 parts by weight of water and then dried, giving a negative electrode plate having a thin carbon powder layer on each of its surfaces.

(d) With use of the electrode plate, a nickel-cadmium cell of the sealed type was fabricated in the same manner as in the other examples.

The cell was charged with 1 hour rate current and then checked for internal gas pressure. After charging the cell with 1 hour rate current for 2 hours, the cell was discharged and then checked for internal gas pressure. The results achieved were apparently superior to those achieved by cells including negative electrode plates which were prepared without the chemical formation process or the carbon powder slurry treatment.

EXAMPLE 8

In the same manner as in Example 7, step (a), a plate having an active material layer was prepared. The plate was dipped in a conductive coating composition "BANIIHAITO BP-333" (for providing conductive carbon), product of Nippon Graphite Kogyo Co., Ltd. and then dried to form a thin carbon powder layer on the active material layer. The plate was thereafter compressed to a thickness of 0.62 mm to obtain a negative electrode plate according to the invention which had a carbon powder layer of about 20 to about 30 microns in thickness.

The electrode was passed through the above-mentioned chemical formation apparatus to charge the plate to about 35% of its capacity, then rinsed with water and dried, affording a completed electrode plate.

EXAMPLE 9

A paste composed chiefly of cadmium oxide and containing a binder and reinforcing material was applied to a conductive carrier sheet to form an active material layer on each surface of the carrier sheet. The resulting plate, not subjected to chemical formation process, was 0.70 mm in thickness. The plate was further coated with a carbon slurry comprising 5 parts by weight of acetylene black, 5 parts by weight of polyvinyl alcohol and 100 parts by weight of water to a thickness of 0.01 mm on each surface, then dried and rolled to obtain a negative electrode plate having a thickness of 0.68 mm. The negative cadmium electrode plate and a known positive nickel electrode plate were wound into a roll with a separator of polypropylene nonwoven fabric interposed therebetween. The roll was placed into a cell casing, into which an electrolytic solution containing 5N sodium hydroxide and 2N lithium hydoxide was placed. The opening of the cell casing was sealed with a gasket of polysulfone to obtain a cell having a nominal capacity of 1.2 AH. Six cells were prepared in this way. In accordance with the amount of electrolytic solution poured into the cell, these cells are represented by A-1 to A-6 as listed below. The amount of the solution is per AH of the nominal capacity.

TABLE 4

| Cell | A-1 | A-2 | A-3 | A-4 | A-5 | A-6 |
|---|---|---|---|---|---|---|
| Amount of electrolytic solution | 3.2 | 3.5 | 3.8 | 4.0 | 4.1 | 4.1 |

TABLE 4-continued

| Cell | A-1 | A-2 | A-3 | A-4 | A-5 | A-6 |
|------|-----|-----|-----|-----|-----|-----|
| (ml/AH) | | | | | | |

What is claimed is:

1. A negative electrode plate for alkaline storage cells of the sealed type comprising an active material layer formed on each of opposite surfaces of an electrically conductive carrier sheet from a paste comprising cadmium oxide powder, and an electrically conductive layer comprising carbon powder and a water-soluble binder formed on a surface of the active material layer.

2. The negative electrode plate as defined in claim 1 wherein the conductive layer is 2 to 20 microns in thickness.

3. The negative electrode plate as defined in claim 1 wherein the water-soluble binder is formed with a binder material selected from the group consisting of polyvinyl alcohol, carboxymethylcellulose, methylcellulose and hydroxypropylcellulose.

4. The negative electrode plate as defined in claim 3 wherein the binder is polyvinyl alcohol.

5. The negative electrode plate as defined in claim 1 wherein said conductive layer is formed by transferring an aqueous slurry of the carbon powder via use of transfer rollers.

6. The negative electrode plate as defined in claim 1 wherein the active material layer contains short graphite fibers as the carbon fibers to form an electrically conductive matrix.

7. The negative electrode plate as defined in claim 1 wherein said negative electrode plate is charged to not more than 60% of its electrical capacity before or after the conductive layer is formed.

8. A negative electrode plate for alkaline storage cells of the sealed type comprising an active material layer formed on each of opposite surfaces of an electrically conductive carrier sheet and from a paste comprising cadmium oxide powder and carbon fibers, and an electrically conductive layer comprising carbon powder and a water soluble binder formed on a surface of the active material layer.

9. The negative electrode plate as defined in claim 8 wherein the conductive layer is 2 to 20 microns in thickness.

10. The negative electrode plate as defined in claim 8, wherein said water soluble binder is formed with a binder material selected from the group consisting of polyvinyl alcohol, carboxymethylcellulose, methycellulose and hydroxypropylcellulose.

11. The negative electrode plate as defined in claim 10 wherein said binder is polyvinyl alcohol.

12. The negative electrode plate as defined in claim 8 wherein the conductive layer is formed by transferring an aqueous slurry of said carbon powder with transfer rollers.

13. The negative electrode plate as defined in claim 8 wherein said active material forming the active material layer comprises said cadmium oxide powder and a small amount of metallic cadmium powder.

14. The negative electrode plate as defined in claim 8 wherein the active material layer contains 0.5 to 5 parts by weight of short graphite fibers per 100 parts by weight of the active material.

15. The negative electrode plate as defined in claim 1 wherein the active material forming the active material layer comprises the cadmium oxide powder and a small amount of metallic cadmium powder.

* * * * *